Jan. 21, 1964  R. E. FOSTER  3,118,927
PROCESS FOR PREPARING ACRYLIC ACID AND ACRYLONITRILE
FROM PROPYLENE
Filed Oct. 29, 1959

INVENTOR
ROBERT E. FOSTER

BY *James H. Ryan*

ATTORNEY

United States Patent Office 3,118,927
Patented Jan. 21, 1964

3,118,927
PROCESS FOR PREPARING ACRYLIC ACID AND ACRYLONITRILE FROM PROPYLENE
Robert E. Foster, Hockessin, Del., assignor to E. I. du Pont de Nemours and Company, Wilmington, Del., a corporation of Delaware
Filed Oct. 29, 1959, Ser. No. 849,630
6 Claims. (Cl. 260—465.3)

This invention relates to, and has as its principal objects provision of, improvements in fixed-bed catalyzed, gas-phase reactions for producing acrylonitrile and acrylic acid.

It has now been found that the problem of temperature control and excessive localized concentration of the reactants in highly exothermic fixed-bed catalytic vapor-phase reactions for producing acryonitrile and acrylic acid can be avoided by injecting one of the reactants at a multitude of points throughout the catalyst bed, contacting the said dispersed component in the catalyst bed with the other reactant or reactants, and removing the desired reaction product from the reaction zone.

One convenient and practical method of operation is by means of a reactor which comprises, in combination, (1) a tube which is closed at one end, has an inlet for introducing gases, and which is porous to the gas for at least a portion of its length between the inlet and closed end, and (2) an outer tube, coaxial with the first, which has an inlet and outlet for passing gases through the section adjacent to the porous section of the inner tube, and which may also serve as a catalyst receptacle.

Apparatus of the invention is shown in the drawing wherein.

Figure 1:
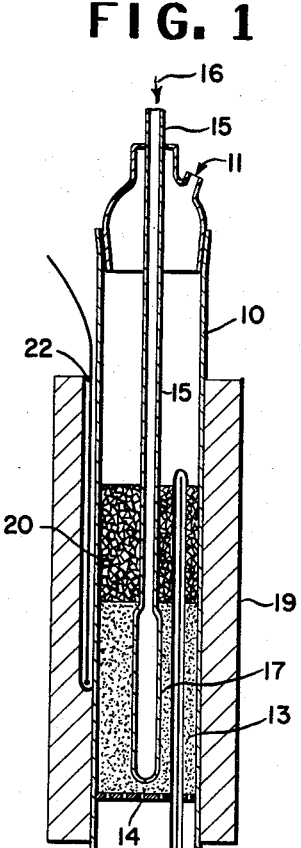
FIGURE 1 is a vertical section of a complete novel reactor containing a fixed-bed catalyst.
Figure 2:
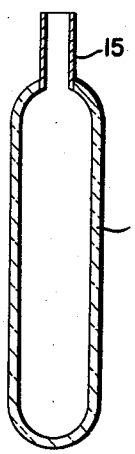
FIGURE 2 is a vertical section of a porous tube which can be employed as a septum (or diffuser) for diffusing a reactant gas into the catalyst bed.

In the figures there is shown an outer tube 10 having a gas inlet 11 and a gas outlet 12. Disposed within tube 10 is a catalyst bed 13 retained by foraminous support 14. Coaxial with outer tube 10 is an inner tube 15 with a gas inlet 16. Extending into catalyst bed 13 is cylindrical diffuser 17, actually part of tube 15. Diffuser 17 is closed at one end but, by reason of its being porous, is nevertheless permeable to a gas. Optionally within diffuser 17 is a second catalyst 18. Around outer tube 10 may be placed a furnace 19 and within the same, lying upon catalyst bed 13, a preheater 20, which is conveniently granular quartz. Thermowells 21 and 22, with associated equipment, may be provided as desired. Conventional collecting apparatus such as a condenser 23, receiver 24, trap 25, and coolers 26 (with ice water) and 27 (with solid carbon dioxide-acetone) may also be provided as desired.

The most important feature of the apparatus is the means for accomplishing the diffusion of the gas stream, for example, porous diffuser 17. This is an effective device which permits diffusing of one reactant and mixing of all reactants simultaneously throughout the catalyst zone. Such operation avoids concentration at any point of excess reactant, simplifies thermal control, and avoids runaway exothermic side reactions.

The porous diffuser used in the detailed examples which follow was made from a commercial heat-resistant microporous glass cylindrical filter, which may contain about 10–75% voids with about 50% voids being preferred as a compromise between strength of the cylinder and escapement area, by attaching the same to a long glass tube (15). The diffuser can also be made from glass filter mats sintered to give strength and porosity or from commercially available, gas-pervious metals. Metallic porous diffusers can be made by powder metallurgical techniques, by compressing screen mesh at high pressure, and by other methods known to those skilled in the metallurgical arts.

The size of the pores operable in the diffuser of this invention may vary widely, e.g., from about 5 to 125 microns, with the range between 20 and 80 microns being preferred. These size ranges correspond to between about 6,000,000 and 10,000 pores per square inch of diffuser surface with about 360,000–25,000 pores per square inch being preferred. It will be appreciated that each pore can be regarded as a source, essentially a "point" source, of gas being diffused into the catalyst. Specific choice of pore size and the number of pores per square inch will be dependent on factors obvious to those skilled in the art, e.g., rate of flow desired, pressure of operation, back pressure, viscosity of gas employed, size of apparatus, size of catalyst granules, and the like.

Various physical embodiments or configurations of the diffuser, in contradistinction to the material from which it is made or to its mode of attachment (melting, sintering, attachment in general through a gas tight seal, etc.) to tube 15, will also be evident. A plurality of diffusers, for example, can be distributed symmetrically or asymmetrically throughout the fixed catalyst bed. Ring-shaped or annular diffusers (not shown) can also be employed, singly or in groups. Such equivalent embodiments, however, are readily apparent to those skilled in the mechanical arts.

Although in FIG. 1 quartz is shown as a preheater, it is to be understood that this is not an essential feature and the quartz can be omitted or replaced by other materials, such as other forms of silica, metal turnings, carborundum granules and the like.

The usual operating technique employing the apparatus described is as follows:

Oxidant gas is passed through the diffuser into the catalyst and the oxidizable gas, diluted with argon, is independently passed through the catalyst from the top, so that mixing of the two gases occurs within the catalyst. The unreacted oxidizable gas, oxidant gas, and reaction product or products are passed through a water-cooled condenser and then to a solid carbon dioxide-acetone trap. After reaction is complete, the trap is allowed to warm to room temperature and the contents are combined with the condensate from the receiver. The product often consists of two liquid layers and is processed by means known to those skilled in the art.

Water and argon are used in the detailed examples as diluent gases. It is to be understood that in place thereof or in combination therewith there can be used other gases or vapors which are inert to the reactants and reaction products. Examples of such include helium, nitrogen, and the like.

The advantages of the present mode of operation are particularly evident in highly exothermic reactions such as the combination of nitric oxide with propylene over a silver catalyst to produce acrylonitrile, the reaction of ammonia, propylene, and oxygen over a dual catalyst system to form acrylonitrile and the direct oxidation of propylene in the presence of water to acrylic acid or acrolein.

The examples which follow illustrate the advantages which accrue from operating in accord with this invention, as compared to conventional methods of premixing of reactants, in fixed-bed operation. In these examples pressures are ambient atmospheric unless otherwise noted.

EXAMPLE I

A. The reactor shown in FIG. 1 was charged with 100 ml. of a potassium-silver cyanide-calcium hydroxide on low-iron silica (8–14 mesh) catalyst, prepared according to U.S. Pat. No. 3,023,226 of February 27, 1962, and 100 ml. of acid-washed, 8–14 mesh calcined quartz as a preheater. The catalyst was activated by heating at 400–420° C. under an argon stream. Through the outside tube was passed a mixture of argon, 11 ml./sec., and propylene, 3.5 ml./sec. Nitric oxide was added at a rate of 2.7 ml./sec. through the inner tube which terminated in a porous glass cylinder, having pores ranging from 40 to 60 microns in diameter, burried within the catalyst bed. The flow rate corresponds to an hourly gaseous space velocity of 594. The heater was energized to maintain the temperature in the reactor at 425–450° C. The conversion of nitric oxide to acrylonitrile was 11% at 80% yield, the space-time was 7 g./l. catalyst/hour.

B. The same apparatus was changed to premix gas operation by means of a three-way stopcock, which isolated the porous tube and mixed the nitric oxide with the other gas stream prior to the preheater. In this instance, an exothermic hot spot of 485° C. was formed at the top of the catalyst bed, oxidation to carbon dioxide was greatly increased, and the chemical yield was reduced to 25%.

EXAMPLE II

A striking demonstration of the advantages of conducting the reaction between propylene and nitric oxide in the mode of this invention is shown by the related series of runs of the table which follows. In the runs of the table the apparatus was modified as described in Example IB so as to be able to switch conveniently from dispersed feed to premix-gas feed. The catalyst employed was the potassium-silver cyanide-calcium hydroxide on low-iron silica of Example I.

Table

| Gas Feed, percent | | | Space Velocity, hr.$^{-1}$ | Internal Temp., °C. | Percent Conv. of NO | Percent Yield | Space Time Yield, g./l./hr. | Remarks |
| --- | --- | --- | --- | --- | --- | --- | --- | --- |
| NO Dispersed Argon | NO | Propylene | | | | | | |
| 70 | 10.0 | 20.0 | 1,000 | 495 | 17 | 87 | 12 | Good temp. profile. |
| 57 | 14.5 | 28.5 | 7,000 | 510 | 19 | 71–87 | 23 | Do. |
| 0 | 33.0 | 67.0 | 600 | 504 | 6 | 72 | 15 | ± 2–5° top to bottom of bed. |
| Premix Gas: 70 | 10 | 20 | 1,000 | 500–550 | 17 | 68 | 9 | |

Concentrations of NO at 20% fused the porous glass tube at the top of catalyst bed; measuerd hot spot, 685° C.

If the concentration of the nitric oxide in premixed gas is increased to 20%, a localized uncontrollable reaction occurs which causes fusion of parts of the glass apparatus. On the other hand, if the nitric oxide is diffused into the catalyst bed, the diluent gas can be omitted and the concentration of the nitric oxide increased to a level considerably beyond that permissible when premixed gas is used.

EXAMPLE III

Figure 3:
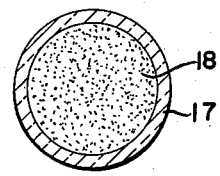
FIGURE 3 is a horizontal section of a porous tube itself serving as a receptacle for a second catalyst.
Figure 4:
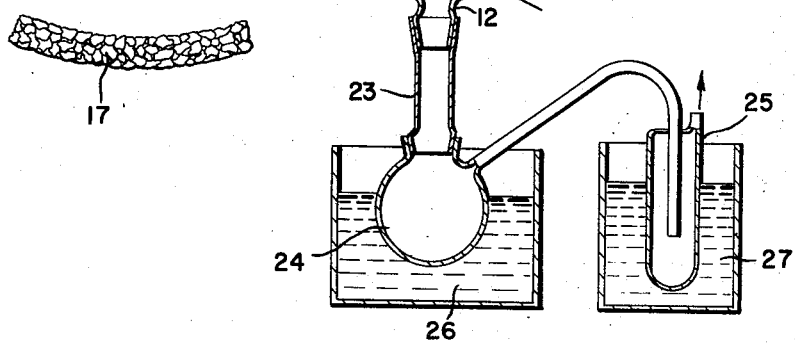
FIGURE 4 is an enlarged section through the wall of the septum showing its porous (sintered glass, ceramic, or metal) structure.

Although in FIG. 1 the diffuser is shown as functioning solely to disperse one of the gaseous reactants, it can be used additionally as a receptacle for a catalyst (FIG. 3), thus making it possible to carry out stepwise reactions. The synthesis of acrylonitrile from ammonia and propylene has been advantageously effected in this way. In this reaction, the porous septum was charged with an ammonia oxidation catalyst and placed within a bed of a nitrile-forming catalyst, e.g., a silver-on-silica catalyst.

Ammonia, 23%, oxygen, 31%, and argon, 46%, were passed at a space velocity of 3600 hr.$^{-1}$ through the porous inner tube in which was placed a commercial platinum-rhodium oxidation catalyst. Simultaneously, through the outer tube, in which was placed the potassium-silver cyanide-calcium hydroxide on low iron silica catalyst of Example 1, propylene, 40%, and argon, 60% were passed. The total space velocity through the nitrile synthesis catalyst, silver-on-silica, was 1350 hr.$^{-1}$. At 460–485° C. internal temperature, the reaction was essentially self-sustaining and could be operated without the external application of heat for about two hours.

By the process described, acrylonitrile was obtained at 7% conversion and 67% yield based on ammonia charged. In contrast, a premixed mixture of the reactants is converted almost entirely over silver-on-silica at 450° C. to carbon dioxide, water, hydrogen cyanide, and nitrogen. Under these conditions nitrile forms only in trace amounts. Dispersion of the oxygen results in formation of small amounts of acrylonitrile and acetonitrile.

EXAMPLE IV

A. The reactor shown in FIG. 1 was charged with 100 ml. of a 4 to 6 mesh cobalt boromolybdate catalyst prepared essentially as described in Example II of U.S. Pat. 2,625,519 of March 7, 1950, and heated at 375 to 425° C. A feed mix composition corresponding to 26 mole percent propylene, 52 mole percent of oxygen, and 22 mole percent of water was processed by passing the propylene through the diffuser and the oxygen and water through the tube surrounding the gaseous diffuser. At a contact time of 4.8 seconds, the observed mole conversion of propylene was 18% and the yield of acrylic acid was 45 mole percent. Only a trace of acrolein was found in the product under these conditions.

B. The above gas composition could not be run under ordinary fixed-bed conditions because it was explosive.

C. The above experiment was repeated with a reaction mixture composed of 52 mole percent of propylene, 26 mole percent of oxygen, and 22 mole percent of water. With this charge the propylene conversion consisted of 30 mole percent of acrylic acid and 12 mole percent of acrolein.

D. The above experiments show that in the gaseous diffuser the product composition can readily be varied by varying the feed mix.

Since obvious modifications and equivalents in the invention will be evident to those skilled in the chemical arts, I propose to be bound solely by the appended claims.

The embodiments of the invention in which an exclusive property or privilege is claimed are defined as follows:

1. In the reaction of propylene and nitric oxide in a fixed-bed catalyst to produce acrylonitrile, the improvement which comprises diffusing one of said gases directly into the bed through a porous diffuser defining pores 5–125 microns in diameter, said pores constituting 10–75% of the surface area of the diffuser, and initially contacting the gases in said bed.

2. In the reaction between propylene and nitric oxide in a fixed-bed catalyst to produce acrylonitrile, the improvement which comprises diffusing nitric oxide directly into the bed through a porous diffuser defining pores 5–125 microns in diameter, said pores constituting 10–75% of the surface area of the diffuser, and initially contacting it with the propylene in said bed.

3. In the synthesis of acrylonitrile by reaction of propylene with nitric oxide, the step which comprises passing said propylene through a fixed bed of a supported potassium-silver cyanide-calcium hydroxide catalyst while simultaneously diffusing the nitric oxide directly into the bed through a porous diffuser defining pores 5–125 microns in diameter, said pores constituting 10–75% of the surface area of the diffuser, thereby effecting initial contact between the propylene and nitric oxide.

4. In the reaction between oxygen and propylene in a fixed-bed catalyst to produce acrylic acid, the improvement which comprises diffusing one of said gases directly into the bed through a porous diffuser defining pores 5–125 microns in diameter, said pores constituting 10–75% of the surface area of the diffuser, and initially contacting the two in said bed.

5. In the reaction between oxygen and propylene in a fixed-bed catalyst to produce acrylic acid, the improvement which comprises diffusing the propylene directly into the bed through a porous diffuser defining pores 5–125 microns in diameter, said pores constituting 10–75% of the surface area of the diffuser, and initially contacting it with the oxygen in said bed.

6. In the synthesis of acrylic acid by reaction of propylene with oxygen, the step which comprises passing said propylene through a fixed bed of a cobalt boromolybdate catalyst while simultaneously diffusing the oxygen directly into the bed through a porous diffuser defining pores 5–125 microns in diameter, said pores constituting 10–75% of the surface area of the diffuser, thereby effecting initial contact between the propylene and oxygen.

References Cited in the file of this patent

UNITED STATES PATENTS

| | | |
|---|---|---|
| 1,097,940 | Ramage | May 26, 1914 |
| 1,909,442 | Williams | May 16, 1933 |
| 2,170,180 | Youker | Aug. 22, 1939 |
| 2,349,045 | Layng et al. | May 16, 1944 |
| 2,452,326 | Rust et al. | Oct. 26, 1948 |
| 2,551,145 | Loy | May 1, 1951 |
| 2,625,519 | Hartig | Jan. 13, 1953 |
| 2,643,266 | Teter | June 23, 1953 |
| 2,664,347 | Rehrig | Dec. 29, 1953 |
| 2,736,739 | England et al. | Feb. 28, 1956 |
| 2,792,337 | Engel | May 14, 1957 |
| 2,796,426 | Marullo et al. | June 18, 1957 |
| 2,801,159 | Carton et al. | July 30, 1957 |
| 2,955,123 | Favis | Oct. 4, 1960 |